United States Patent Office 3,353,578
Patented Nov. 21, 1967

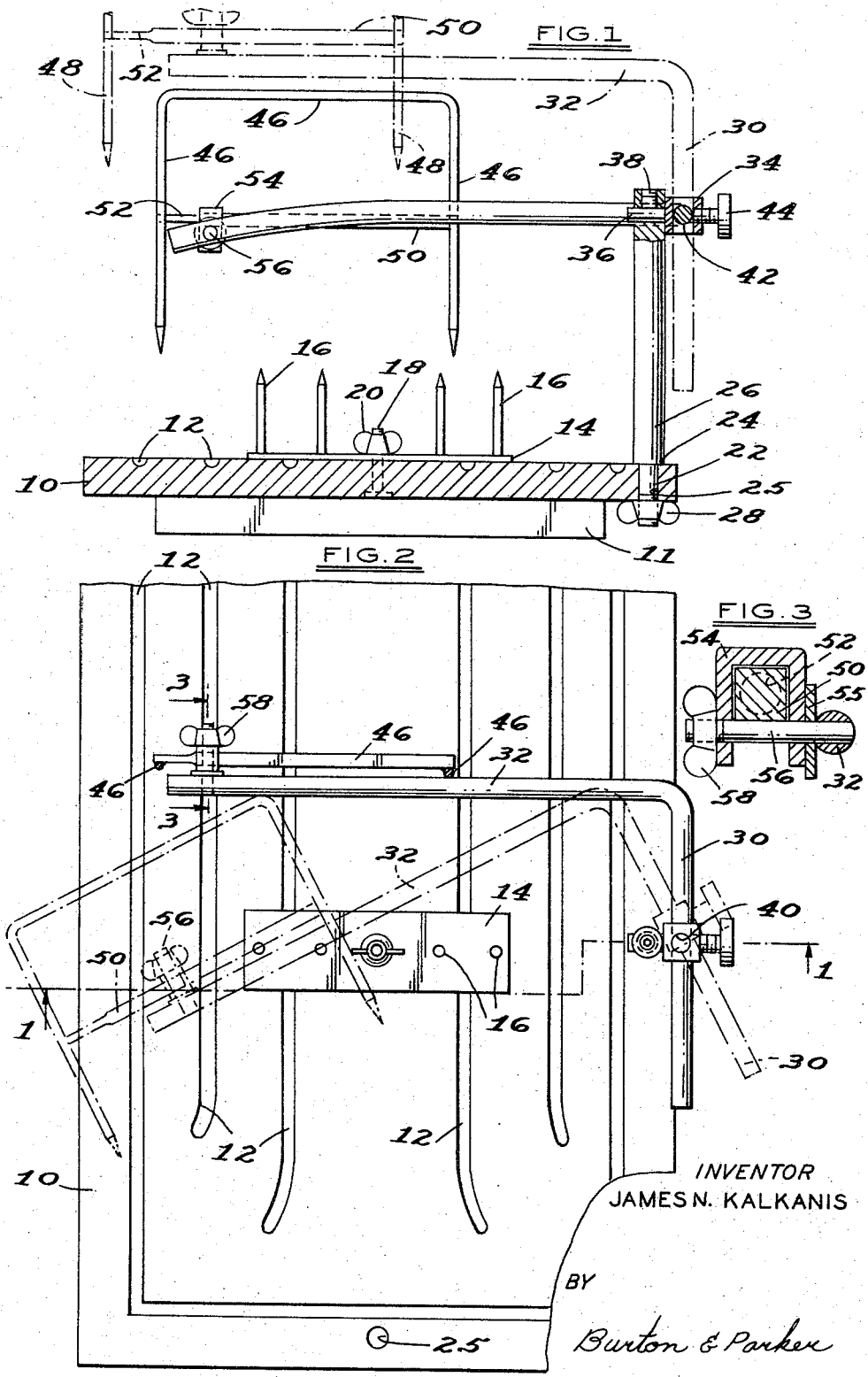

3,353,578
MEAT-HOLDING DEVICE
James N. Kalkanis, 5521 Chalmers,
Detroit, Mich. 48213
Filed Feb. 3, 1966, Ser. No. 524,779
8 Claims. (Cl. 146—218)

This invention relates to a meat holder mounted upon a carving board and adapted to be used to support pieces of meat of widely varying size and shape such as a fowl, a ham, a roast, or other portions of meat for carving.

An object is to provide such a meat holder so mounted on the board as to have a wide range of adjustment whereby the meat may be positioned at many varying positions for carving.

Another object is the provision of such a meat holder designed particularly for the use of a family or household of folks and which will serve all purposes for which it might be desired for use.

Another object is to provide a meat holder having an upright standard mounted on a carving board to project upright therefrom, and an L-shaped hanger carried by the standard, which hanger has one arm that overhangs the carving board and which arm supports a prong element having a plurality of meat-engaging prongs, and wherein the range of adjustment of the prong element with respect to its supporting arm is such that the prongs may be disposed to project into the meat on the board vertically with respect to the plane of the board or to project horizontally thereinto, and also the prong element is capable of swingable adjustable movement to be disposed angularly at a wide variety of angles with respect to the plane of the carving board.

A meritorious feature is that the hanger arm is adapted to be supported upon the standard for vertical adjustment or horizontal adjustment with respect thereto, and the board is so designed as to support the standard of the meat-engaging portion of the holder at a plurality of points whereby it may be positioned to engage a piece of meat from a multiplicity of positions.

Other objects, advantages, and meritorious features will more fully appear from the following specification, claims, and accompanying drawings, wherein:

FIG. 1 is a cross-sectional view taken on line 1—1 of FIG. 2;

FIG. 2 is a plan of the meat holder showing the carving board also in plan and partly broken away; and FIG. 3 is a cross-sectional view taken on the line 3—3 of FIG. 2.

The meat holder includes a carving board 10 which may be of suitable hardwood or any other satisfactory material. It is shown as provided with fluid grooves or channels 12. The board carries a plate 14 provided with a series of upright prongs 16. The plate is secured to the upper face of the board by a pin 18 which extends through the plate and into the board and is provided with a thumbnut 20 threaded upon the pin whereby the plate may be shifted to different angular positions with respect to the board.

Adjacent to one margin of the board is a passageway 25 therethrough adapted to receive a reduced end portion 24 of a standard 26 as shown particularly in FIG. 1. This reduced end portion of the standard is threaded at its outer end to receive a thumbnut 28 to securely position the standard to project upright from the board. The board in FIG. 2 is provided with a second passageway 25 through one end into which the reduced end of the standard is receivable and such additional passageways as desired may be provided.

The bottom surface of the board is provided with a pair of spacers 11, one of which is shown in FIG. 1, adapted to support the board itself spaced above a table so as to receive the thumbnut 28 within this space. It is apparent that at least two such spacers or runners would be provided on the bottom of the board (another one parallel to and spaced from spacer 11 in FIG. 1) to support the carving board parallel to the surface of the supporting table. The standard has a shoulder as shown which rests upon the upper surface of the board so it forms a stable support for a meat-engaging hanger assembly.

The hanger assembly comprises an L-shaped hanger having one arm 30 which is designed to be received within a mounting secured upon the standard 26 to support the other arm 32 of the hanger to overhang the board 10 as shown in FIG. 1.

The mounting consists of a block 34 which has a pin portion 36 that is shown in FIG. 1 as extending through the upright standard 26. Such pin is affixed to the standard as by being welded or brazed thereto or in any other suitable fashion as by means of a stud screw 38 threaded into the standard from the top as shown in FIG. 1.

The block is provided with a horizontal diametrical passageway 34 extending therethrough as shown in FIG. 1, and through which the arm, shown in solid line and in cross section extends. It is also shown with a vertical diametrical passageway 42 extending therethrough also as shown in FIG. 1 but through which the arm 30 is shown in dotted line. The arm 30 of the hanger is adapted to be slidably received through either of said passageways for linear adjustment therethrough. A thumbscrew 44 is mounted within the block to be threaded down against the arm 30 of the hanger to hold the hanger at adjusted positions with respect to the block and extending either vertically thereabove or horizontally to one side thereof. In FIG. 1 the L-shaped hanger is shown in solid line as disposed within a plane parallel to the plane of the board and is shown in dotted line as disposed perpendicular with respect to the plane of the board.

In FIG. 2 the L-shaped hanger is shown as being moved angularly with respect to the board by the difference in position between the solid line and the dotted line representation of the hanger. This positioning is obtained by loosening the thumbnut 28 and rotatably adjusting the standard 26 so as to vary the position of the overhanging arm 32 of the hanger angularly with respect to the board.

That arm 32 of tthe hanger which normally overhangs the board is provided with a meat-engaging prong element indicated generally as 46. This prong element is generally U-shaped and has two prongs each indicated by the numeral 48 carried by a bottom portion of the U-shaped portion element. The two prongs are further connected by a cross bar 50 extending therebetween. This cross bar is shown throughout the major portion of its length as non-circular (here shown as square) in cross section as illustrated in FIG. 3. At one end as at 52 the cross bar is circular in cross section as shown in FIGS. 1 and 3.

The U-shaped prong element is supported upon the arm 32 of the hanger by a mounting shown particularly in FIG. 3. This mounting comprises a saddle part 54 which is pivotally supported upon a pivot pin 56 carried by the arm 32. A washer 55 is supported upon the pin 56 between the arm 32 and the saddle 54. The pin is provided with a thumbnut 58 to hold the saddle thereon. The cross bar 50 of the U-shaped prong element is illustrated as extending slidably through the saddle of the mounting for linear adjustment therethrough. As the cross bar is adjusted linearly of the mounting it is apparent that the prong element is moved toward and away from the general direction of the standard.

It is also apparent that when the cross bar has its circular portion 52 moved into the saddle that the prong element may be rotated from a vertical to a horizontal position or vice versa so that the prong element may be rotated within the saddle. Such rotation swings the prongs so that they may enter a piece of meat either vertically or horizontally. These two positions are shown in FIGS. 1 and 2 of the drawing.

It is apparent therefore that the piece of meat being carved upon the board may be engaged by the prongs 46 projecting thereinto either verticallly or horizontally by adjusting the prong element within the saddle. It is also apparent that pieces of meat of different size may be successfully held in place by shifting the hanger so that the arm 30 thereof extends either horizontally through the standard mounting or vertically therethrough. It is also evident that the rotatable adjustment of the standard permits angular engagement of the prongs with the meat as illustrated in FIG. 2 in dotted line.

What is claimed is:

1. In a meat holder, a carving board, a standard carried by the board to project upright therefrom, said standard provided with a mounting for a hanger, an L-shaped hanger having one arm slidably mounted within said mounting supporting the other arm overhanging the board, that arm of the hanger mounted within the mounting being slidably adjustable with respect thereto substantially parallel to the plane of the board to move the arm of the hanger overhanging the board toward and away from the upright standard, said arm of the hanger which overhangs the board provided with a mounting pivotally supported thereon for swingable movement about an axis extending substantially parallel to the plane of the board, a prong element having a plurality of meat-engaging prongs, said prong element supported by the mounting upon said other arm of the hanger for swingable movement with its mounting angularly with respect to the plane of the board and for slidable movement with respect to its mounting diametrically with respect to the axis of the mounting.

2. A meat holder as defined in claim 1 characterized in that the arm of the hanger supported within the standard mounting is rotatably swingably adjustable with respect thereto to swing the arm of the hanger that overhangs the board angularly up and down toward or away from the plane of the board.

3. A meat holder as defined in claim 1 characterized in that the standard mounting is adapted to support the arm of the hanger carried thereby whereby such arm may be adjustably moved either perpendicularly with respect to the plane of the board or parallel with respect thereto.

4. A meat holder as defined in claim 1 characterized in that said prong element has a cross bar carrying the prongs, which cross bar is supported by the mounting on the arm of the hanger that overhangs the board for slidable movement linearly of the bar with respect to the mounting diametrically with respect to the pivotal axis of the mounting.

5. A meat holder as defined in claim 1 characterized in that said prong element has a pair of prongs carried by a cross bar, which bar is supported by the mounting upon that arm of the hanger which overhangs the board for slidable movement of the bar linearly with respect to the mounting, said bar being throughout the major portion of its length of a non-circular shape in cross section and so engaged by its mounting as to be normally non-rotatably supported therein but having one portion of the length circular in cross section at which position said bar may be rotated within its mounting to vary the position of its prongs from a position parallel with respect to the plane of the board to a position perpendicular with respect to the plane of the board.

6. A meat holder as defined in claim 1 characterized in that the board is provided with a plurality of spaced apart portions each adapted to receive and support the standard to project upright above the plane of the board.

7. A meat holder as defined in claim 1 characterized in that the mounting carried by the standard is adapted to receive and support one arm of the hanger for adjustable slidable movement with respect to the mounting parallel to the plane of the board and said mounting is also adapted to receive the same arm of the hanger for adjustable slidable movement perpendicular with respect to the plane of the board and means is provided to releasably retain said arm at said adjusted positions.

8. A meat holder as defined in claim 1 characterized in that the standard is mounted upon the board for rotatable adjustable positioning with respect to the board and means is provided to engage the standard releasably with the board at said rotatable adjusted positions.

References Cited

UNITED STATES PATENTS

| | | | |
|---|---|---|---|
| 1,999,809 | 4/1935 | Gloekler | 146—218 |
| 2,655,191 | 10/1953 | Partin | 146—218 |

W. GRAYDON ABERCROMBIE, *Primary Examiner.*